US008886643B2

(12) United States Patent
Callari et al.

(10) Patent No.: US 8,886,643 B2
(45) Date of Patent: Nov. 11, 2014

(54) PRESENTING SOCIAL SEARCH RESULTS

(75) Inventors: Francesco G. Callari, San Francisco, CA (US); Matthew E. Kulick, San Francisco, CA (US)

(73) Assignee: Google Inc., Mountain View, CA (US)

( * ) Notice: Subject to any disclaimer, the term of this patent is extended or adjusted under 35 U.S.C. 154(b) by 406 days.

(21) Appl. No.: 12/957,735

(22) Filed: Dec. 1, 2010

(65) Prior Publication Data

US 2012/0078884 A1 Mar. 29, 2012

Related U.S. Application Data

(60) Provisional application No. 61/386,198, filed on Sep. 24, 2010.

(51) Int. Cl.
| G06F 7/00 | (2006.01) |
| G06F 17/30 | (2006.01) |
| G06Q 99/00 | (2006.01) |
| G06F 15/16 | (2006.01) |
| G06F 17/20 | (2006.01) |

(52) U.S. Cl.
CPC ................................ G06F 17/30867 (2013.01)
USPC ........... 707/732; 707/706; 707/721; 707/722; 707/723; 707/769; 709/203; 705/319; 715/204; 715/277

(58) Field of Classification Search
None
See application file for complete search history.

(56) References Cited

U.S. PATENT DOCUMENTS

| 7,593,954 | B1 * | 9/2009 | Lloyd et al. ................... 707/102 |
| 8,121,999 | B2 * | 2/2012 | Hansen et al. ................ 707/706 |
| 8,370,329 | B2 * | 2/2013 | Gutt et al. ..................... 707/721 |
| 2008/0005073 | A1 | 1/2008 | Meek et al. |
| 2009/0281988 | A1 | 11/2009 | Yoo |
| 2010/0010987 | A1 | 1/2010 | Smyth et al. |
| 2010/0094869 | A1 | 4/2010 | Ebanks |
| 2010/0174709 | A1 | 7/2010 | Hansen et al. |
| 2011/0072010 | A1 * | 3/2011 | Wu et al. ....................... 707/722 |

OTHER PUBLICATIONS

International Search Report and Written Opinion, International Application No. PCT/US2011/053217, mailed Dec. 18, 2012, 8 pages.
Authorized Officer Nora Lindner, International Preliminary Report on Patentability, International Application No. PCT/US2011/053217, mailed Apr. 4, 2013, 5 pages.
Examination Report in Australian Application No. 2011305109, issued May 17, 2014, 3 pages.

* cited by examiner

Primary Examiner — Ajay Bhatia
Assistant Examiner — Cheryl M Shechtman
(74) Attorney, Agent, or Firm — Fish & Richardson P.C.

(57) ABSTRACT

Methods, systems, and apparatus, including computer programs encoded on a computer storage medium, for presenting social search results. In one aspect, a method includes identifying members of a social affinity group of the user, the social affinity group having members having a relationship to the user. The method includes receiving search results including search results that reference resources associated with members of the social affinity group. The method includes identifying a first search result that references the social network site. The method includes identifying a second search result that references a resource found on the social network site and associated with a member of the social affinity group. The method includes generating a response to the query comprising instructions that the first search result be presented in proximity to the second search result.

18 Claims, 5 Drawing Sheets

PRESENTING SOCIAL SEARCH RESULTS

CROSS-REFERENCE TO RELATED APPLICATIONS

This application claims the benefit of U.S. Provisional Applications No. 61/386,198, filed Sep. 24, 2010. The above-referenced application is incorporated herein by reference.

BACKGROUND

This specification relates to searching resources indexed by a search engine.

Social network sites are web sites that enable users to establish and track relationships between the user and other users of the social network site. Search engines identify resources stored in an index which are responsive to queries. A social search engine can identify resources that are associated with members of a user's social affinity group.

SUMMARY

This specification describes technologies relating to presentation of search results.

In general, one innovative aspect of the subject matter described in this specification can be embodied in methods that include the actions receiving in a search system a query from a user; identifying members of a social affinity group of the user, the social affinity group having members having a relationship to the user; receiving search results responsive to the query from a search engine, the search results including search results that reference resources associated with members of the social affinity group; identifying among the search results a first search result that references a social network site; identifying among the search results a second search result that references a resource that is found on the social network site and is associated with a member of the social affinity group; and generating, for presentation to the user, a response to the query, the response comprising instructions that the first search result be presented in proximity to the second search result Other embodiments of this aspect include corresponding systems, apparatus, and computer programs, configured to perform the actions of the methods encoded on computer storage devices. These and other embodiments can each optionally include on or more of the following features. The query may be received from a client device; and the response may be sent to the client device. The response may include instructions that the second search result be presented nested under the first search result. The response may include instructions that the second search result be presented in line with the first search result. Features may include determining in the search system that the query references the social network site. Determining that the query references the social network site may include determining that the query matches an entry in a data structure at least one of a set of queries previously determined to be associated with social network sites. Identifying the second search result may include identifying a search result that references a user profile on the social network site and identifying the search result as the second search result. Identifying the second search results may include identifying a search results that reference a user posts on the social network site that are is more recent than a threshold age. Identifying the second search result may include identifying a search result that references a user post on the social network site; and identifying the search result as the second social search result. Determining members of the social affinity group of the user may occur prior to receiving the query from the user. Determining members of the social affinity group of the user may include identifying users identified as members of the social affinity group in a user profile of the user. Determining members of the social affinity group of the user may include determining members of the social affinity group from other users associated with the user on the social network site. Identifying the second search result that references the resource is associated with the member may include identifying the member endorsed the resource. Identifying the second search result that references the resource that is found on the social network site and is associated with the member may include identifying determining that the member published the resource. Identifying the second search result that references the resource that is found on the social network site and is associated with the member may include determining that the member shared the resource. Receiving search results responsive to the query from a search engine may include receiving the search results in response to multiple requests, the multiple requests comprising a first request requesting general search results responsive to the query and a second request requesting social search results responsive to the query. Receiving search results responsive to the query from a search engine may include receiving the search results in response to a single request.

Particular embodiments of the subject matter described in this specification can be implemented so as to realize one or more of the following advantages. Social search results can be presented in proximity to related general search results. A user can quickly identify content on a social network site likely to be of interest to the user.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
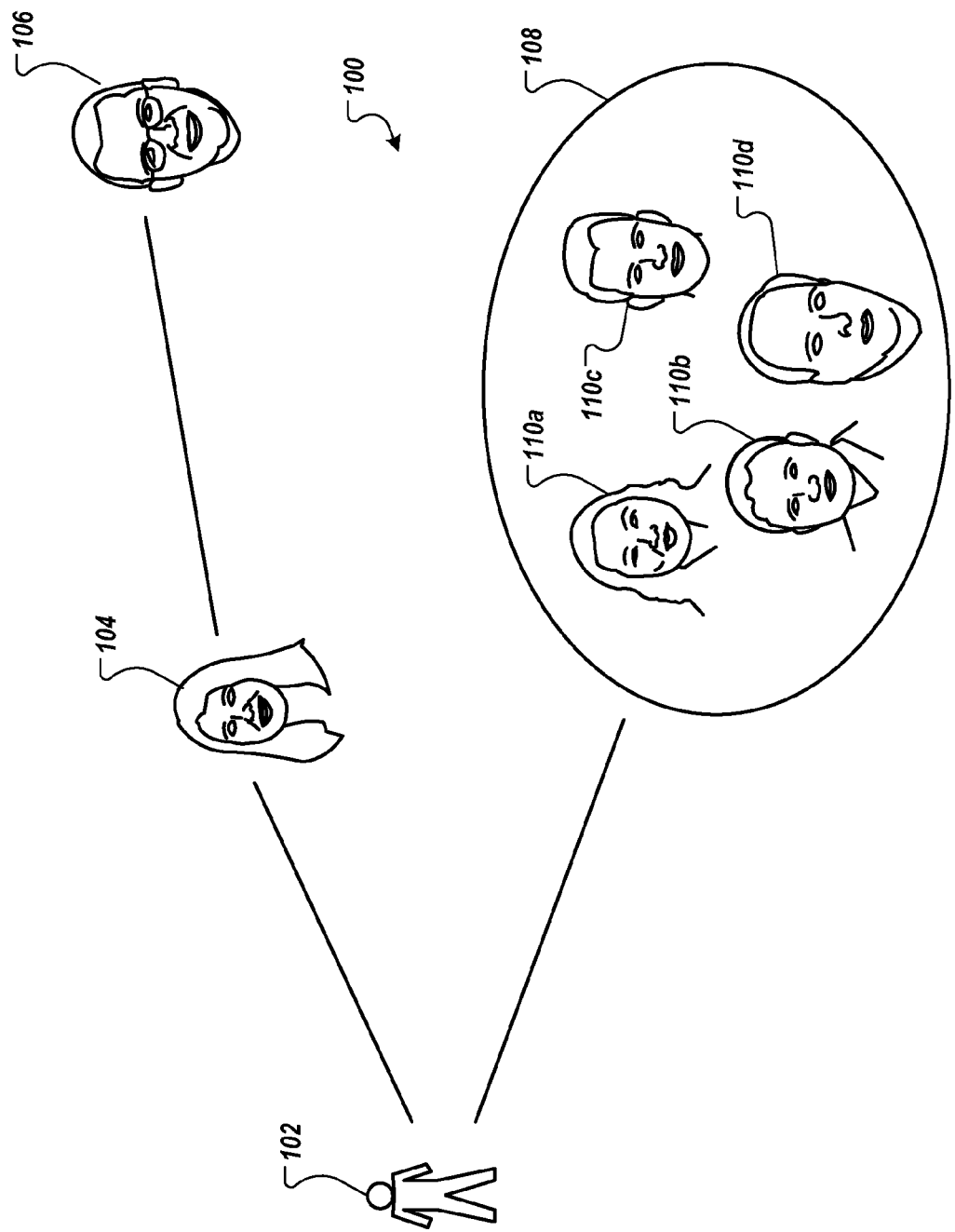
FIG. 1 illustrates an example social affinity group 100 of a user 102.

A user using an Internet search engine to search for resources generally has social interests (e.g., interests in the resources about or generated by other people, or otherwise associated with other people) that are different from the social interests of a general population of users. For example, the user can have an interest in resources that are associated with people having a relationship to the user that is reflected in an online social network such people will be referred to collectively as the user's social affinity group. A picture of people is presumably more interesting to a user if the picture is of the members than if it is of people who have no relationship with the user. A user can also have a social interest in resources endorsed by a member of the user's social affinity group. For example, a user is more likely to be interested in an article endorsed by a member of the user's social affinity group than an article that was not. To reflect this social interest, a search result that includes the picture can be ranked higher for the user than for the general population of users. A social search engine is capable of identifying resources that are likely to be of social interest to the user (social search results) in addition to search results of general interest (general search results). Generally, a resource may, but need not, correspond to a file. A resource may be stored in a portion of a file that holds other resources, in a single file dedicated to the resource in question, or in multiple coordinated files. A user can grant permission (opt-in) and allow a system to identify associations between the user and resources. For situations in which the systems discussed here collect personal information about users, the users may be provided with an opportunity to opt in or opt out of programs or features that may collect personal information (e.g., information about a user's preferences or a user's contributions to social content providers). User may also be informed of the accompanying limitations on the functionality of a service that may result from limiting access to such personal information. In addition, certain data may be anonymized in one or more ways before it is stored or used, so that personally identifiable information is removed. For example, a user's identity may be anonymized so that the no personally identifiable information can be determined for the user and so that any identified user preferences or user interactions are generalized (for example, generalized based on user demographics) rather than associated with a particular user.

A social network site is an online service or platform on the World Wide Web that enables users to build social networks with other users. These social networks can be based on personal or professional relationships, for example. Users of social network sites can post updates and communicate with each other through the site. Social network sites generally include resources, e.g., web pages, that are crawled and indexed by Internet search engines. Such resources, having a uniform resource locator (URL) that includes, as the host name, a domain name associated with the social network site, will be referred to as being located on the social network site.

A user searching for a social network site on a search engine is likely to be interested in resources relating to members of the users social affinity group found on the social network site FIG. 1 illustrates an example social affinity group 100 of a user 102. Generally, a social affinity group is a group of other users with whom the user has a relationships known by the social search system. As used in this specification, the term "member" refers to a member of the user's social affinity group. The social affinity group of the user includes a first member 104 identified by the user 102. The user 102 can identify the first member 104 in, for example, a user profile. A user profile can include, for example, a list of members of the user's social affinity group. The user profile can also include information that identifies social network sites in which the user participates.

The social affinity group 100 of the user 102 also includes a group of members 108 related to the user 102 according to a social network site. In some implementations the user 102 identifies himself as a member of a social network site. With permission from the user 102, the social network site can be examined to identify the members on the social network site (e.g., the members 110a, 110b, 110c, 110d).

The social affinity group 100 of the user 102 can also include others indirectly related to the user 102. For example, the social affinity group 100 of the user 102 includes an individual 106 who is indirectly related to the user 102 through the first member 104 of the user. In this example, the both the user 102 and the first member 104 have provided social affinity group information and granted permission for the social affinity group information to be used. Generally, users can select whether or not to establish a social affinity group. Users can also either opt in or opt out of having the social affinity information used.

The social affinity group of the user can also include groups of members. For example, the social affinity group of the user can include a group of co-workers. The group can be defined in the user's user profile based on a place of employment. In some implementations, the user identifies himself as an employee of a company; the user can then be identified with a group of others employed by the same company. In other implementations, the user can identify the co-workers as being members of a group in the user profile. Other groups can also be identified, for example, class mates, fraternity/sorority members, club memberships, professional organizations, social clubs, or fan clubs. In general, a user can select which personal information he or she wishes to be used to establish social affinity groups. For example, one user may elect to use high school as a membership criterion for social affinity groups and another user may elect not to use high school as a membership criterion for a social affinity groups. In this example, the first user may be associated with other users who attended the same high school and also selected to use high school as a membership criterion.

The social affinity group can also include others who have other relationships with the user. For example, in some implementations, a social affinity group of the user can include the contributors to blogs or micro-blogs to which the user subscribes. In some implementations, a social affinity group of the user can include others with whom the user has had email correspondence, others identified in the users address book, and others in an instant messaging contact list.

Figure 2:
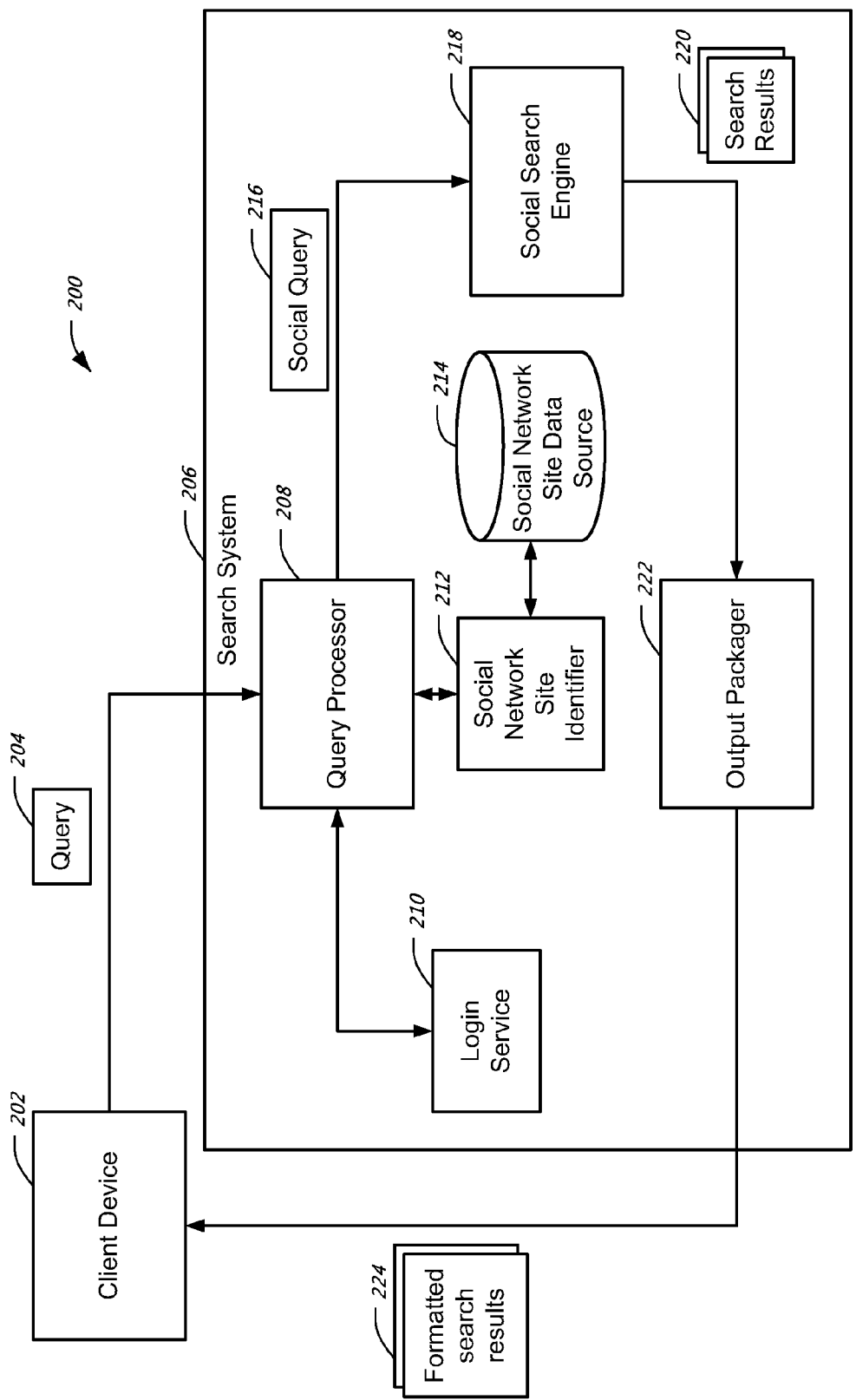
FIG. 2 illustrates an example system 200 for the presentation of social search results.

FIG. 2 illustrates an example system 200 for the presentation of social search results. A client device 202, for example, a personal computer executing a web browser, sends a query 204 to a search system 206. The search system 206 can include multiple computers in multiple locations. The query can be sent over a network, for example, a local area network (LAN), a wide area network (WAN), or the Internet. The query can be sent using conventional network communication protocols, for example, as a Hyper Text Transport Protocol (HTTP) request.

A query processor 208 on the search system 206 receives the query 204. The query processor 208 sends the query to a social network site identifier 212. The social network site identifier is a component of the search system 206 that determines if the query 204 corresponds to a known social network site. In some implementations, the social network site identifier 212 compares the query 204 to a social network site data source 214. The social network site data source 214 can be, for example, a white list that includes names of social network sites, in another example the white list may also contain commonly used abbreviations of social network sites. In general, a white list is a list of entities that are recognized as being members of a particular class, in this example, the white list is a list of known social network sites. The social network site data source 214 can also be other data structures, for example, a table in a relational database.

In some implementations, the social network site data source 214 can include a table that maps the query 204 or individual query terms within the query 204 to a social network site. In some implementations, the social network site identifier 212 only compares the query 204 to the social network site data source 214 if the query 204 meets threshold criteria, for example, if the query is short (e.g., one word).

In some implementations, the social network site identifier 212 can identify social network sites based on an analysis of historic user activity. Social network sites can be identified as domains or websites that produce a relatively high number of social search results. For example, if, historically, the domain www.socialsite.com appears frequently in social search results, then the social network site identifier 212 can determine that www.socialsite.com is a social network site. Generally, users can grant permission to the search system to identify social site results. Social site results can also be identified anonymously (e.g. without reference to the user who executed the query). In some implementations, a count of social search results associated with a web site can be tallied. If the number of social search results exceeds a threshold then the web site is considered a social network site.

In some implementations, the social network site identifier 212 generates a list of social network sites periodically. For example, the social network site identifier may generate the content of the social network site data source 214 daily, weekly, or monthly.

In some implementations, the social network site identifier 212 identifies queries that correspond to social network sites based on an analysis of historic user activity. If a statistically significant number of users select a known social network site after submitting a particular query, then that particular query is determined to correspond to the social network site. In some implementations, the social network site identifier 212 stores the particular query and an indication of the social network site to which it corresponds in the social network site data source 214.

In some implementations, the social network site identifier 212 identifies social network sites based on an analysis of the resources found on the site. For example, web sites that contain a large number of resources that are tagged as belonging to a member of the site can be identified as social network sites. Similarly, web sites where a large percentage of the resource found on the site are tagged as belonging to a member of the site can be identified as social network sites.

The social network site identifier 212 can also determine that the query 204 corresponds to a known social network site in other ways. In some implementations, with the user's permission, the social network site identifier 212 analyzes a user's history (e.g., as reflected in a session log) to determine that the current query is likely related to a social network site. For example, if the user has recently searched for a social network site then the current query may also be determined to be about a social network site. In some implementations, the social network site identifier 212 may apply conventional spelling correction algorithms to the query to determine if the query is likely a misspelling of a name or abbreviation of a social network site. In another implementation, the social network site data source 214 can include common misspellings of the names and abbreviations of social network sites. In some implementations, the social network site identifier 212 can determine that the query 204 corresponds to a known social network site based on an analysis of prior user activity. For example, if a significant number of prior users (e.g. greater than a threshold number) selected search results that reference resources on a social network site after submitting the query 204, then the query is determined to correspond to that social network site. For example, if social site www.socialnetworksite.com is among the result shown for the query "friends of the social network" and users consistently selects the www.socialnetworksite.com result, then one may infer that the query is corresponds to www.socialnetworksite.com.

In some implementations, users can opt in or opt out from having search history used to identify social network sites. In other implementations the search history is anonymized such that individual user activity is not identifiable.

In some implementations, the query processor 208 can interact with a login service 210. The login service provides an identifier describing the user of the client device 202. In other implementations, the user of the client device 202 is identified by a conventional social search engine, for example the social search engine 218.

In response to determining that the social network site identifier 212 identified a social network site associated with the query 204, the query processor 208 creates a social query 216 based on the query 204 and sends the social query 216 to the social search engine 218. In some implementations, the social query 216 is also based on the user identified by the login service 210. For example, the query processor can create the social query 216 by appending a parameter to the query 204. The parameter instructs the social search engine 218 to perform a search that includes social search results.

In other implementations, the query processor 208 can send multiple requests to the social search engine. The first request requests general search results responsive to the query 204. The second request requests social search results responsive to the query 204.

The social search engine 218 produces a set of search results 220 responsive to the query 204 using conventional means. Each of the search results references a resource. In some implementations, each search result is associated with a score, which is a measure of the quality of the resource and the responsiveness of the resource to the query. In some implementations, social search results include tags or attributes that identify the social search results as social search results and that identify the social relationship between the user and the resource referenced by the search result.

An output packager 222 receives the search results 220. The output packager 222 is a component of the search system 206 that orders and formats the search results producing formatted search results 224 for presentation to the user. For example, the output packager can place social search results that reference resources on the social network site that corresponds to the query 204 in proximity to a search result that references a home page of that social network site. In some implementations, the social search results are placed immediately after the social network search result. In some implementations, the social search results are nested underneath the social network search result. In some implementations, the social search results are presented in line with the social network search result.

In some implementations, the output packager 222 examines the social search result and determines a category for the resource referenced by the examined social search result. Based on the determined category, the output packager 222 can place the social search result. For example, a social search result that references a user profile can be placed in line with the social network search result and a social search result that references a user post can be nested under the social network search result. Generally, a user profile is a user's primary page on the social network site. The user profile can include user posts or references to user posts. A user post is a resource created by the user (e.g., a blog entry, a micro-blog entry, or a status update).

In some implementations, a maximum number of social search results are formatted for presentation. For example, the output packager 222 can place up to a maximum threshold number of social search results in line with the social network search result (e.g., two, four, or six social search results).

Similarly, the output packager 222 can place up to a second maximum threshold of social search results nested under the social network search result (e.g., two, four, six, eight, or ten search results). In some implementations, social search results that are not placed in proximity to the social network search result (e.g., nested under or inline) are discarded and not presented to the user.

In some implementations, social search results can be placed in proximity to the social network search result whenever a social network search result appears in a set of search results. For example, anytime a query returns a search result that reference www.socialnetworksite.com social search results referencing resources on www.socialnetworksite.com can be placed in proximity to the social network search result.

In some implementations, social search results that reference user posts can be excluded from presentation by the output packager 222 based on the age of the user post. For example, the output packager 222 can exclude social search results that reference user posts if the user posts are older than a threshold age (e.g., 1 day, 2 days, 3 days, or 7 days). In some implementations, the output packager 222 can exclude search results that reference user posts based on the type of user post and a threshold specific to that type. For example, the output packager 222 can exclude social search results that reference micro-blog posts created 2 days ago, status updates created 1 day ago, blog posts created 7 days ago, and so on.

In some implementations, the threshold age can be based on a measure of the affinity between the user and the creator of the user post. Generally, the greater the affinity between the user and the creator the longer the threshold period (e.g., a blog post may have a threshold of 3 days for most user posts, but the threshold may be increased to 7 days for user posts by creators with a high affinity with the user.

The formatted search results 224 are sent to the client device 202 for presentation to the user.

In some implementations, the determination to add social search results can be based on the generated search results. For example, the output packager 222 may compares search results to a list of known social network sites. The list of social network sites may be a determined by an analysis of user history as discussed above. For any search result that references a known social network site, the output packager can request social search results. The obtained social search results are integrated with the search results as described above.

Figure 3:
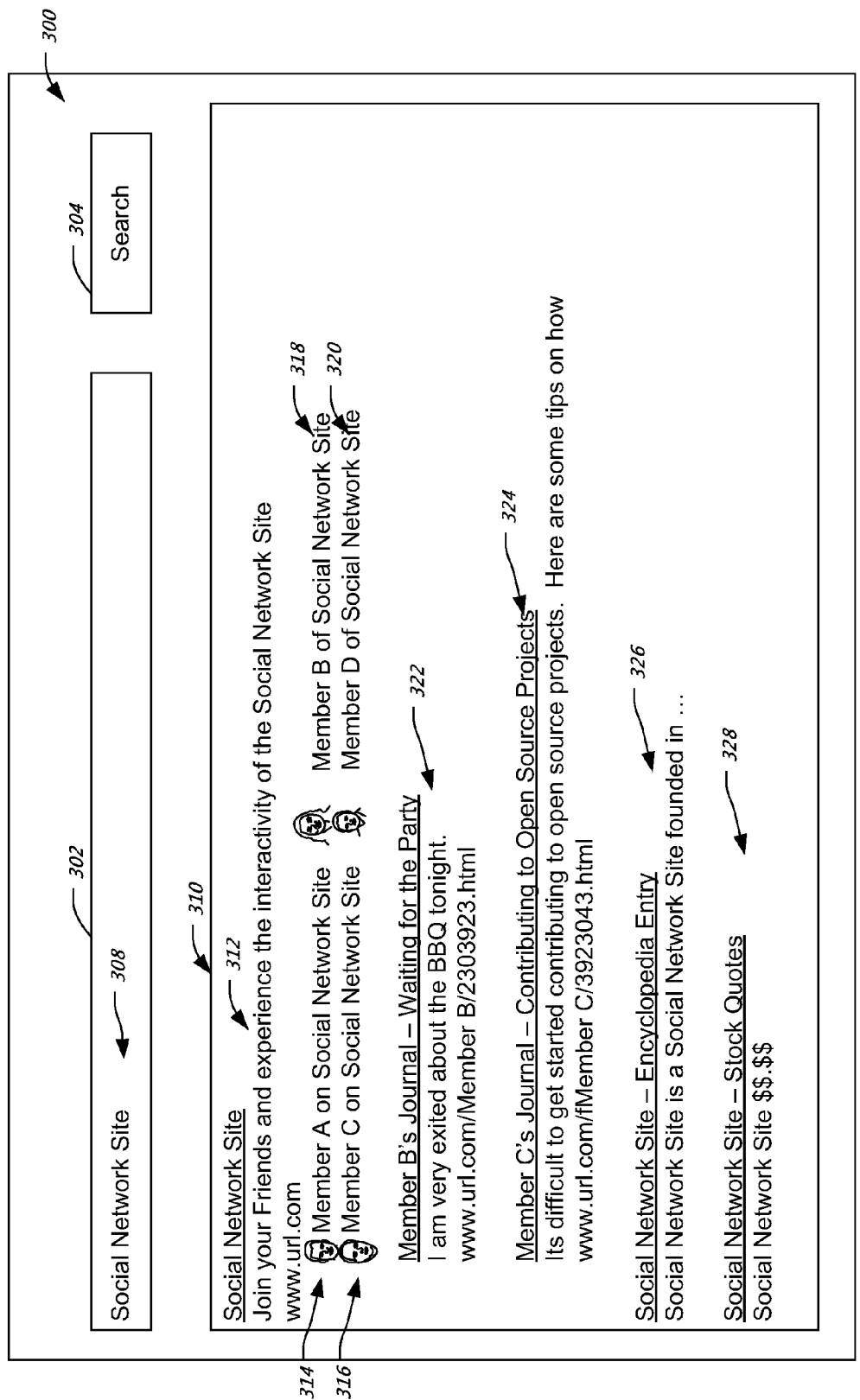
FIG. 3 illustrates an example search page presenting links related to a user's social affinity group.

FIG. 3 illustrates an example search page presenting links related to a user's social affinity group. A search page 300 can present in a user interface on a client device, for example in a web browser. The search page 300 includes a text input area 302. The user enters a query 308 in the text input area 302 and selects (clicks) a search button 304. The search page sends a request to a search engine as described above). In this example, the server determines that the query 308 corresponds to a social network site, and therefore generates general search results and social search results.

Search results responsive to the query are presented in a separate area 310 of the search page 300. The search results include a social network search result 312 that references the social network site corresponding to the query 308.

Displayed in line with the social network search result 312, the search results include four social search results that reference user profiles on the social network site (Member A's user profile 314, Member B's user profile 318, Member C's user profile 316, and Member D's user profile 320). In this example, the user profile search results are presented in line with the social network search result 312. In some implementations, the social search results are accompanied by a picture of the user whose user profile is identified in the social search result.

In some implementations, search results referencing user profiles are identified based on the URLs associated with the search result. For example, for a social network site "socialnetworksite.com," user profiles can be located in a user profile directory "socialnetworksite.com/userprofile/Member_A.htm." User profiles can also be identified based on the content of the resources referenced by the search result. For example, each user profile page on a social network site may include phrases such as "View Photos of Member" and "Sent Member a Message". Profile pages may also include formatted sections of text, for example an "Information Section" which includes a birthday, a current city or location, or biography.

Nested beneath the social network search result 312 are two search results referencing user posts on the social network site (Member B's journal entry 322 and Member C's journal entry 324). In some implementations, the social search results are accompanied by a picture of the user whose user post is identified in the social search result.

Beneath the two search results referencing user posts are general search results responsive to the query 308 (a social network site—encyclopedia entry 326 and a social network site—stock quote 328.) In some scenarios, user posts can be found on the user profile page and may also be identifiable as distinct resources. For example, the user's profile page may include blog posts, micro-blog posts, and status updates that are all identifiable as distinct resources.

In some implementations, the general search results are examined to ensure that they do not duplicate the social search results. If a general search result references the same resource as a social search result then the general search result is removed from the general search results.

Figure 4:
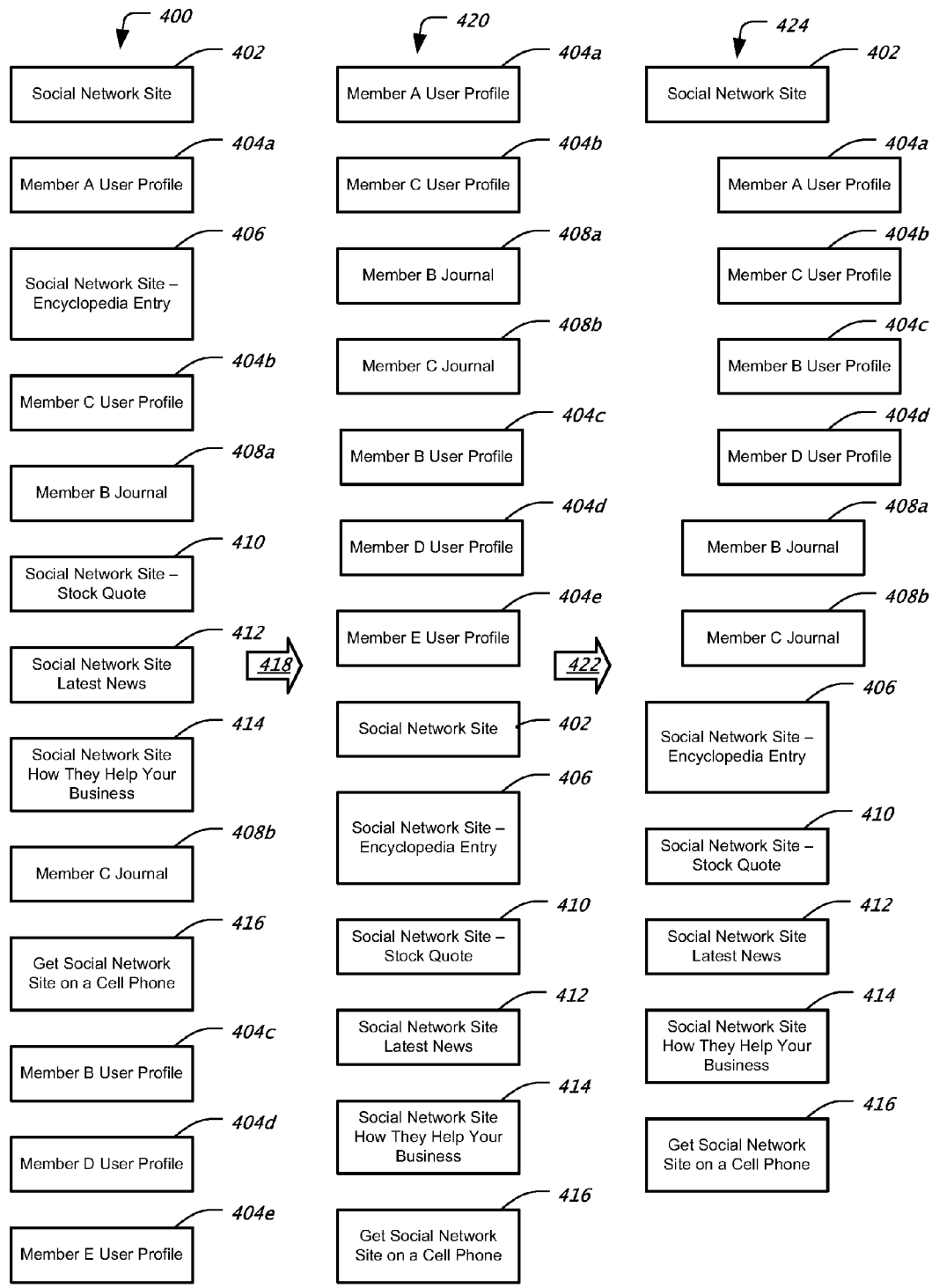
FIG. 4 illustrates an example of formatting search results for display.

FIG. 4 illustrates an example of formatting search results for display. In this example, the social search engine produces a list of search results 400. The list of search results 400 includes a social network search result 402, general search results 406, 410, 412, 414, 416, and social search results including user profile search results 404a, 404b, 404c, 404d, 404e and user post search results 408a, 408b. The search results are listed in an order based on an initial determination of the relevancy of the search result to the query (e.g. sorted based on a score).

Illustrated by process arrow 418, the ranking of the search results 404 is adjusted so that social search results are at the top of the list of search results (e.g. the user profile search results 404a, 404b, 404c, 404d, and 404e and the user post search results 408a, 408b). This may be accomplished, for example, by applying a very large boost to the score associated with the social search result and sorting based on the score. In some implementations, the score for each social search results is given the same boost to maintain the relative order within the social search results.

Illustrated by process arrow 422, the sorted search results 420 are formatted. The social network search result 402 is identified. The user profiles search results 404a, 404b, 404c, and 404d are in line with the social network search result 402. In this example, the "Member E User Profile" search result 404e is discarded because the system only accepts the first four user profiles. The user post search results 408a and 408b are presented nested under the social search result 402. The remaining general search results are presented subsequently based on the original ordering.

Figure 5:
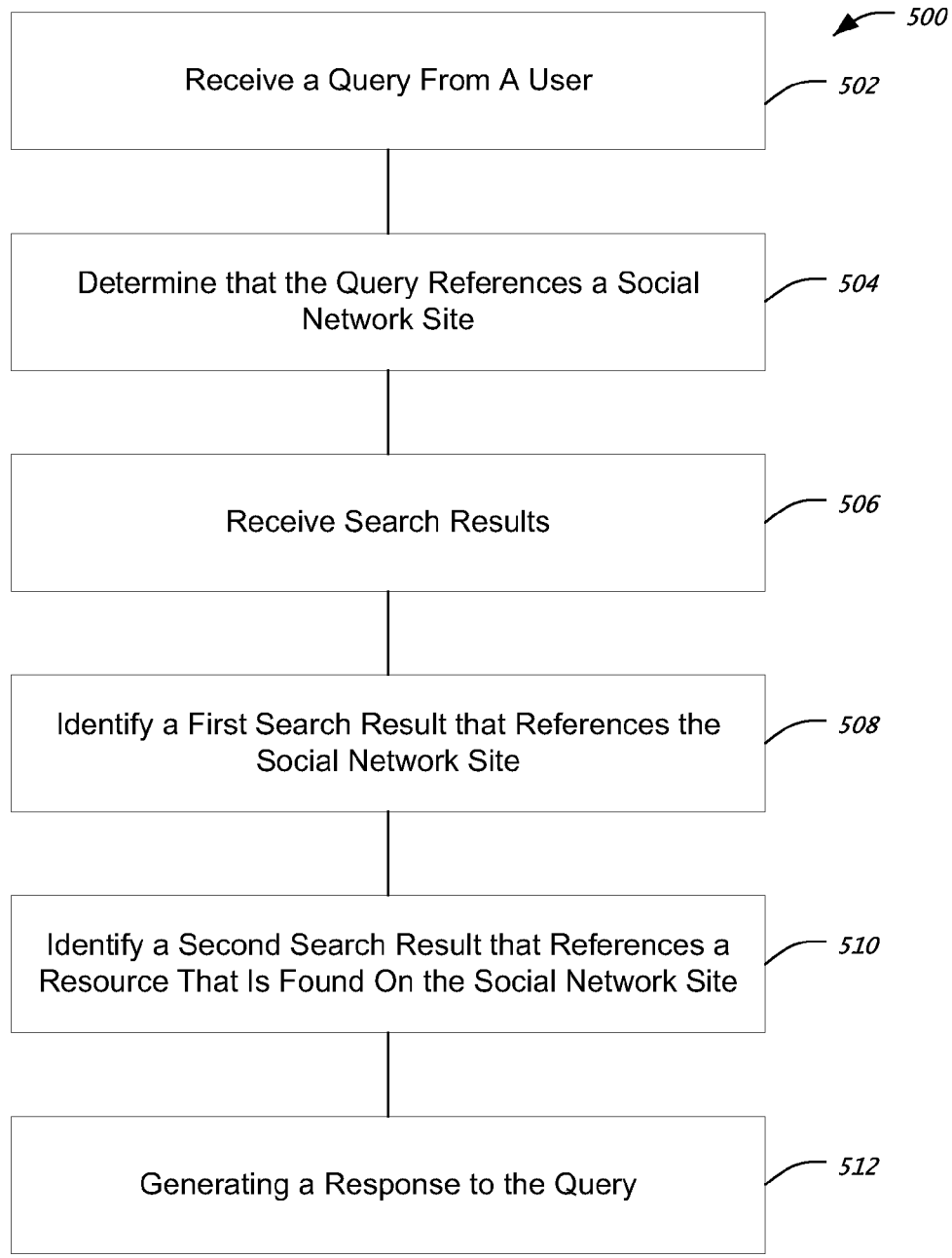
FIG. 5 illustrates an example process for presenting social search results associated with a social network site.

FIG. 5 illustrates an example process for presenting social search results associated with a social network site. For convenience, the process will be described in relation to a search system performing the process.

The process receives a query from a user (502). The query can be sent from a client device being operated by the user (e.g., a personal computer or a smart phone running a suitable web browser). The query can be sent over a network (e.g. a LAN, WAN, or the Internet) using a conventional protocol (e.g., HTTP).

The process determines that the query references a social network site (504). In some implementations, the query is compared (or substrings of the query are compared) to a white list that contains a list of social network sites. If the query matches an entry in the white list, then the query is determined to reference a social network site.

The process receives search results (506) from a search engine, the search results including general search results that reference resources responsive to the query and social search results that reference resources that are both responsive to the query and associated with other users that are in the social affinity group of the user.

The process identifies a first search result that references the social network site (508). The first search result is identified from among the search results.

The process identifies a second search result that references a resource that is located on the social network site (510).

The process generates a response to the query (512). The response may be, for example, a HTTP Response message. In some implementations, the response can include formatting information to present the first social search result in proximity to the first general search result. As discussed above, in some implementations, the formatting information can include information to present the first social search result can be nested under the first general search result. In some implementations, the formatting information includes information to present first social search result can be in line with the general search result. In some implementations, the response is sent to the client device for presentation to the user.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As an alternative to the attached claims and the embodiments described in the above description, the present invention could also be described by one of the following embodiments:

Embodiment 1 is directed to a computer-implemented method comprising: receiving in a search system a query from a user; identifying members of a social affinity group of the user, the social affinity group having members having a relationship to the user; receiving search results responsive to the query from a search engine, the search results including search results that reference resources associated with members of the social affinity group; identifying among the search results a first search result that references a social network site; identifying among the search results a second search result that references a resource that is found on the social network site and is associated with a member of the social affinity group; and generating, for presentation to the user, a response to the query, the response comprising instructions that the first search result be presented in proximity to the second search result.

Embodiment 2 is related to the method of embodiment 1, wherein the query is received from a client device; and wherein the response is sent to the client device.

Embodiment 3 is related to the method of any one of embodiments 1 or 2, wherein the response comprises instructions that the second search result be presented nested under the first search result.

Embodiment 4 is related to the method of any one of embodiments 1 or 2, wherein the response comprises instructions that the second search result be presented in line with the first search result.

Embodiment 5 is related to the method of any one of embodiments 1 through 4, wherein the method further comprises determining in the search system that the query references the social network site.

Embodiment 6 is related to the method of embodiment 5, wherein determining that the query references the social network site comprises determining that the query matches at least one of a set of queries previously determined to be associated with social network sites.

Embodiment 7 is related to the method of any one of embodiments 1 through 6, wherein identifying the second search result comprises identifying a search result that references a user profile on the social network site; and identifying the search result as the second search result.

Embodiment 8 is related to the method of embodiment 7, wherein identifying the second search result comprises identifying a search result that reference a user post on the social network site that is more recent than a threshold age.

Embodiment 9 is related to the method of any one of embodiments 1 through 6, wherein identifying the second search result comprises identifying a search result that references a user post on the social network site; and identifying the search result as the second social search result.

Embodiment 10 is related to the method of any one of embodiments 1 through 6, wherein identifying the second search result that references the resource is associated with the member comprises identifying the member endorsed the resource.

Embodiment 11 is related to the method of any one of embodiments 1 through 6, wherein identifying the second search result that references the resource that is found on the social network site and is associated with the member comprises determining that the member published the resource.

Embodiment 12 is related to the method of any one of embodiments 1 through 6, wherein identifying the second search result that references the resource that is found on the social network site and is associated with the member comprises determining that the member shared the resource.

Embodiment 13 is related to the method of any one of embodiments 1 through 12, wherein determining members of the social affinity group of the user occurs prior to receiving the query from the user.

Embodiment 14 is related to the method of any one of embodiments 1 through 12, wherein determining members of the social affinity group of the user comprises identifying users identified as members of the social affinity group in a user profile of the user.

Embodiment 15 is related to the method of any one of embodiments 1 through 12, wherein determining members of the social affinity group of the user comprises determining members of the social affinity group from other users associated with the user on the social network site.

Embodiment 16 is related to the method of any one of embodiments 1 through 15, wherein receiving search results responsive to the query from a search engine comprises receiving the search results in response to multiple requests, the multiple requests comprising a first request requesting general search results responsive to the query and a second request requesting social search results responsive to the query.

Embodiment 17 is related to the method of any one of embodiments 1 through 15, wherein receiving search results responsive to the query from a search engine comprises receiving the search results in response to a single request.

Embodiment 18 is directed to a computer storage medium encoded with a computer program, the program comprising instructions that when executed by data processing apparatus cause the data processing apparatus to perform operations comprising: receiving in a search system a query from a user; identifying members of a social affinity group of the user, the social affinity group having members having a relationship to the user; receiving search results responsive to the query from a search engine, the search results including search results that reference resources associated with members of the social affinity group; identifying among the search results a first search result that references the social network site; identifying among the search results a second search result that references a resource that is found on the social network site and is associated with a member of the social affinity group; and generating, for presentation to the user, a response to the query, the response comprising instructions that the first search result be presented in proximity to the second search result.

Embodiment 19 is related to the computer storage medium of embodiment 18, wherein the query is received from a client device; and wherein the response is sent to the client device.

Embodiment 20 is related to the computer storage medium of any one of embodiments 18 or 19, wherein the response comprises instructions that the second search result be presented nested under the first search result.

Embodiment 21 is related to the computer storage medium of any one of embodiments 18 or 19, wherein the response comprises instructions that the second search result be presented in line with the first search result.

Embodiment 22 is related to the computer storage medium of any one of embodiments 18 through 21, wherein the method further comprises determining in the search system that the query references the social network site.

Embodiment 23 is related to the computer storage medium of embodiment 22, wherein determining that the query references the social network site comprises determining that the query matches at least one of a set of queries previously determined to be associated with social network sites.

Embodiment 24 is related to the computer storage medium of any one of embodiments 18 through 23, wherein identifying the second search result comprises identifying a search result that references a user profile on the social network site; and identifying the search result as the second search result.

Embodiment 25 is related to the computer storage medium of embodiment 24, wherein identifying the second search result comprises identifying a search result that reference a user post on the social network site that is more recent than a threshold age.

Embodiment 26 is related to the computer storage medium of any one of embodiments 18 through 23, wherein identifying the second search result comprises identifying a search result that references a user post on the social network site; and identifying the search result as the second social search result.

Embodiment 27 is related to the computer storage medium of any one of embodiments 18 through 23, wherein identifying the second search result that references the resource is associated with the member comprises identifying the member endorsed the resource.

Embodiment 28 is related to the computer storage medium of any one of embodiments 18 through 23, wherein identifying the second search result that references the resource that is found on the social network site and is associated with the member comprises determining that the member published the resource.

Embodiment 29 is related to the computer storage medium of any one of embodiments 18 through 23, wherein identifying the second search result that references the resource that is found on the social network site and is associated with the member comprises determining that the member shared the resource.

Embodiment 30 is related to the computer storage medium of any one of embodiments 18 through 29, wherein determining members of the social affinity group of the user occurs prior to receiving the query from the user.

Embodiment 31 is related to the computer storage medium of any one of embodiments 18 through 29, wherein determining members of the social affinity group of the user comprises identifying users identified as members of the social affinity group in a user profile of the user.

Embodiment 32 is related to the computer storage medium of any one of embodiments 18 through 29, wherein determining members of the social affinity group of the user comprises determining members of the social affinity group from other users associated with the user on the social network site.

Embodiment 33 is related to the computer storage medium of any one of embodiments 18 through 32, wherein receiving search results responsive to the query from a search engine comprises receiving the search results in response to multiple requests, the multiple requests comprising a first request requesting general search results responsive to the query and a second request requesting social search results responsive to the query.

Embodiment 34 is related to the computer storage medium of any one of embodiments 18 through 32, wherein receiving search results responsive to the query from a search engine comprises receiving the search results in response to a single request.

Embodiment 35 is directed to system comprising one or more computers and one or more storage devices storing instructions that, when executed by the one or more computers, cause the one or more computers to perform operations comprising: receiving in a search system a query from a user; identifying members of a social affinity group of the user, the social affinity group having members having a relationship to the user; receiving search results responsive to the query from a search engine, the search results including search results that reference resources associated with members of the social affinity group; identifying among the search results a first search result that references the social network site; identifying among the search results a second search result that references a resource that is found on the social network site and is associated with a member of the social affinity group; and generating, for presentation to the user, a response to the query, the response comprising instructions that the first search result be presented in proximity to the second search result.

Embodiment 36 is related to the system of embodiment 35, wherein the query is received from a client device; and wherein the response is sent to the client device.

Embodiment 37 is related to the system of any one of embodiments 35 or 36, wherein the response comprises instructions that the second search result be presented nested under the first search result.

Embodiment 38 is related to the system of any one of embodiments 35 or 36, wherein the response comprises instructions that the second search result be presented in line with the first search result.

Embodiment 39 is related to the system of any one of embodiments 35 through 38, wherein the method further comprises determining in the search system that the query references the social network site.

Embodiment 40 is related to the system of embodiment 39, wherein determining that the query references the social network site comprises determining that the query matches at least one of a set of queries previously determined to be associated with social network sites.

Embodiment 41 is related to the system of any one of embodiments 35 through 40, wherein identifying the second search result comprises identifying a search result that references a user profile on the social network site; and identifying the search result as the second search result.

Embodiment 42 is related to the system of embodiment 41, wherein identifying the second search result comprises identifying a search result that reference a user post on the social network site that is more recent than a threshold age.

Embodiment 43 is related to the system of any one of embodiments 35 through 40, wherein identifying the second search result comprises identifying a search result that references a user post on the social network site; and identifying the search result as the second social search result.

Embodiment 44 is related to the system of any one of embodiments 35 through 40, wherein identifying the second search result that references the resource is associated with the member comprises identifying the member endorsed the resource.

Embodiment 45 is related to the system of any one of embodiments 35 through 40, wherein identifying the second search result that references the resource that is found on the social network site and is associated with the member comprises determining that the member published the resource.

Embodiment 46 is related to the system of any one of embodiments 35 through 40, wherein identifying the second search result that references the resource that is found on the social network site and is associated with the member comprises determining that the member shared the resource.

Embodiment 47 is related to the system of any one of embodiments 35 through 46, wherein determining members of the social affinity group of the user occurs prior to receiving the query from the user.

Embodiment 48 is related to the system of any one of embodiments 35 through 46, wherein determining members of the social affinity group of the user comprises identifying users identified as members of the social affinity group in a user profile of the user.

Embodiment 49 is related to the system of any one of embodiments 35 through 46, wherein determining members of the social affinity group of the user comprises determining members of the social affinity group from other users associated with the user on the social network site.

Embodiment 50 is related to the system of any one of embodiments 35 through 49, wherein receiving search results responsive to the query from a search engine comprises receiving the search results in response to multiple requests, the multiple requests comprising a first request requesting general search results responsive to the query and a second request requesting social search results responsive to the query.

Embodiment 51 is related to the system of any one of embodiments 35 through 49, wherein receiving search results responsive to the query from a search engine comprises receiving the search results in response to a single request.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving in a search system a query from a user;
identifying members of a social affinity group of the user, the social affinity group having members having a relationship to the user;
receiving search results responsive to the query from a search engine, the search results including search results that reference resources associated with members of the social affinity group;
identifying one or more words of the query;
comparing the one or more words to one or more social network names included in a list, each social network name associated with a social network site;
based on the comparing, determining that at least one of the one or more words matches a particular social network name of the one or more social network names, the particular social name associated with a particular social network site;
in response to the determining:
  identifying among the search results a first search result that references the particular social network site,
  identifying among the search results a second search result that references a resource that is found on the particular social network site and is associated with a member of the social affinity group; and generating, for presentation to the user, a response to the query, the response comprising instructions that the first search result be presented in proximity to the second search result.

2. The method of claim 1 wherein the query is received from a client device, and wherein the response is sent to the client device.

3. The method of claim 1 wherein the response comprises instructions that the second search result be presented nested under the first search result.

4. The method of claim 1 wherein the response comprises instructions that the second search result be presented in line with the first search result.

5. The method of claim 1 further comprising determining that the query matches at least one of a set of queries previously determined to be associated with social network sites.

6. The method of claim 1 wherein identifying the second search result comprises:

identifying a search result that references a user profile on the particular social network site; and identifying the search result as the second search result.

7. The method of claim 6 wherein identifying the second search result comprises:

identifying a search result that reference a user post on the particular social network site that is more recent than a threshold age.

8. The method of claim 1 wherein identifying the second search result comprises:

identifying a search result that references a user post on the particular social network site; and identifying the search result as the second social search result.

9. The method of claim 1 wherein identifying members of the social affinity group of the user occurs prior to receiving the query from the user.

10. The method of claim 1 wherein identifying members of the social affinity group of the user comprises:

identifying users identified as members of the social affinity group in a user profile of the user.

11. The method of claim 1 wherein identifying members of the social affinity group of the user comprises:

identifying members of the social affinity group from other users associated with the user on the social network site.

12. The method of claim 1 wherein identifying the second search result that references the resource is associated with the member comprises identifying the member that endorsed the resource.

13. The method of claim 1 wherein identifying the second search result that references the resource that is found on the particular social network site and is associated with the member comprises determining that the member published the resource.

14. The method of claim 1 wherein identifying the second search result that references the resource that is found on the particular social network site and is associated with the member comprises determining that the member shared the resource.

15. The method of claim 1 wherein receiving search results responsive to the query from the search engine comprises receiving the search results in response to multiple requests, the multiple requests comprising a first request requesting general search results responsive to the query and a second request requesting social search results responsive to the query.

16. The method of claim 1 wherein receiving search results responsive to the query from the search engine comprises receiving the search results in response to a single request.

17. A non-transitory computer storage medium encoded with a computer program, the program comprising instructions that when executed by data processing apparatus cause the data processing apparatus to perform operations comprising:

receiving in a search system a query from a user;

identifying members of a social affinity group of the user, the social affinity group having members having a relationship to the user;

receiving search results responsive to the query from a search engine, the search results including search results that reference resources associated with members of the social affinity group;

identifying one or more words of the query;

comparing the one or more words to one or more social network names included in a list, each social network name associated with a social network site;

based on the comparing, determining that at least one of the one or more words matches a particular social network name of the one or more social network names, the particular social name associated with a particular social network site;

in response to the determining:

identifying among the search results a first search result that references the particular social network site, identifying among the search results a second search result that references a resource that is found on the particular social network site and is associated with a member of the social affinity group; and generating, for presentation to the user, a response to the query, the response comprising instructions that the first search result be presented in proximity to the second search result.

18. A system comprising:

one or more computers and one or more storage devices storing instructions that, when executed by the one or more computers, cause the one or more computers to perform operations comprising:

receiving in a search system a query from a user;

identifying members of a social affinity group of the user, the social affinity group having members having a relationship to the user;

receiving search results responsive to the query from a search engine, the search results including search results that reference resources associated with members of the social affinity group;

identifying one or more words of the query;

comparing the one or more words to one or more social network names included in a list, each social network name associated with a social network site;

based on the comparing determining that at least one of the one or more words matches a particular social network name of the one or more social network names, the particular social name associated with a particular social network site;

in response to the determining:

identifying among the search results a first search result that references the particular social network site, identifying among the search results a second search result that references a resource that is found on the particular social network site and is associated with a member of the social affinity group; and generating, for presentation to the user, a response to the query, the response comprising instructions that the first search result be presented in proximity to the second search result.

* * * * *